United States Patent
Roh

(10) Patent No.: US 9,785,582 B2
(45) Date of Patent: Oct. 10, 2017

(54) DATA PROCESSING ARCHITECTURE AND DATA PROCESSING METHOD

(71) Applicant: Samsung Electronics Co., Ltd., Suwon-si, Gyeonggi-do (KR)

(72) Inventor: Chang Hyun Roh, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 63 days.

(21) Appl. No.: 14/712,111

(22) Filed: May 14, 2015

(65) Prior Publication Data

US 2016/0170917 A1 Jun. 16, 2016

(30) Foreign Application Priority Data

Dec. 11, 2014 (KR) ........................ 10-2014-0178441

(51) Int. Cl.
G06F 9/54 (2006.01)
G06F 13/16 (2006.01)

(52) U.S. Cl.
CPC .......... *G06F 13/1663* (2013.01); *G06F 9/544* (2013.01)

(58) Field of Classification Search
CPC .............................. G06F 9/544; G06F 13/1663
See application file for complete search history.

(56) References Cited

U.S. PATENT DOCUMENTS

| | | | | |
|---|---|---|---|---|
| 5,297,260 A | * | 3/1994 | Kametani | G06F 9/3877 257/E21.705 |
| 8,560,705 B2 | | 10/2013 | Larson et al. | |
| 2008/0295119 A1 | | 11/2008 | Muscarella | |
| 2011/0172570 A1 | | 7/2011 | Shimizu et al. | |
| 2012/0157894 A1 | | 6/2012 | Hiki | |
| 2012/0316476 A1 | | 12/2012 | Shimizu et al. | |
| 2013/0253385 A1 | * | 9/2013 | Goffer | A61H 1/0244 601/35 |
| 2014/0079564 A1 | * | 3/2014 | Becerra | F24F 11/04 417/53 |

FOREIGN PATENT DOCUMENTS

| | | |
|---|---|---|
| JP | 2009245118 A | 10/2009 |
| JP | 2013074364 A | 4/2013 |
| JP | 2014064246 A | 4/2014 |
| KR | 20030055416 A | 7/2003 |
| KR | 20130119862 A | 11/2013 |
| KR | 20130133601 A | 12/2013 |

OTHER PUBLICATIONS

Lesher, Christine, "Industrial Ethernet or Fieldbus Network?", Issue 27, 2013, saved by Internet Archive on Jul. 25, 2014.*

* cited by examiner

*Primary Examiner* — Edward Dudek, Jr.
(74) *Attorney, Agent, or Firm* — Harness, Dickey & Pierce, P.L.C.

(57) ABSTRACT

A data processing architecture includes a processor which may access a memory and fetch a command recorded in the memory, transmit the fetched command to a subject configured to perform an operation corresponding to the fetched command through a network, and receive a result of performing the operation from the subject and record the result of performing the operation in the memory.

17 Claims, 5 Drawing Sheets

DATA PROCESSING ARCHITECTURE AND DATA PROCESSING METHOD

CROSS-REFERENCE TO RELATED APPLICATION

This application claims the priority benefit of Korean Patent Application No. 10-2014-0178441, filed on Dec. 11, 2014, in the Korean Intellectual Property Office, the entire contents of which are incorporated herein by reference in its entirety.

BACKGROUND

1. Field

At least some example embodiments relate to walking assist device.

2. Description of the Related Art

Use of an operating system (OS) is necessary in consideration of convenience and scale of development of applications. A realtime control element such as a sensor requiring high-speed measurement or a motor used for control, which is included in a system, may require numerous iterative operations. Due to the numerous iterative operations of the control element, OS scheduling or jitters may be factors in system performance deterioration. Thus, multi-processing may be applied to classify an application execution environment and the realtime control element, and process accordingly.

The multiprocessing may require a main processor, a subprocessor, and a network to connect the main processor and the subprocessor. The multiprocessing may employ a high-speed network. The high-speed network may incur an added cost and hinder fast and easy commercialization of the system. The multiprocessing may also employ a low-speed network. The low-speed network may degrade an overall performance of the system, although the low-speed network reduces a cost burden.

SUMMARY

There is a desire for technology for allowing a system to achieve an effective performance despite use of such a low-speed network.

At least some example embodiments relate to a data processing method to be performed by a data processing architecture.

In at least some example embodiments, the method may include fetching, using a background processor, a command of an application recorded in a memory, transmitting, using the background processor, the fetched command to a subject configured to perform an operation corresponding to the fetched command, receiving, using the background processor, a result of performing the operation of the subject, and recording, using the background processor, the result of performing the operation in the memory.

The memory may include an inter-process communication (IPC) shared memory.

The memory may include a first memory area in which a realtime command of the application is recorded and a second memory area in which a non-realtime command of the application is recorded.

The command may be recorded in the memory by the application through an application programming interface (API).

The transmitting transmits the fetched command through a transmission thread of the background processor, and the receiving receives the result of performing the operation through a reception thread of the background processor.

The recording records the result of performing the operation in a buffer.

The data processing architecture may be embedded in a walking assistance device.

Other example embodiments relate to a data processing architecture.

In at least some example embodiments, the architecture may include an API configured to process a command of an application, a memory configured to record the processed command, and a background processor configured to access the memory to fetch the recorded command, transmit the fetched command through a network to a subject configured to perform an operation corresponding to the fetched command, and receive a result of performing the operation from the subject and record the result of performing the operation in the memory.

The memory may include an IPC shared memory.

The memory may include a first memory area in which a realtime command of the application is recorded and a second memory area in which a non-realtime command of the application is recorded.

The background processor may include a transmission thread configured to transmit the fetched command and a reception thread configured to receive the result of performing the operation.

The background processor may record the result of performing the operation in a buffer to be mapped to the subject.

The background processor may access the memory at each selected cycle.

The network may include a fieldbus network.

The architecture may be included in a walking assistance device.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
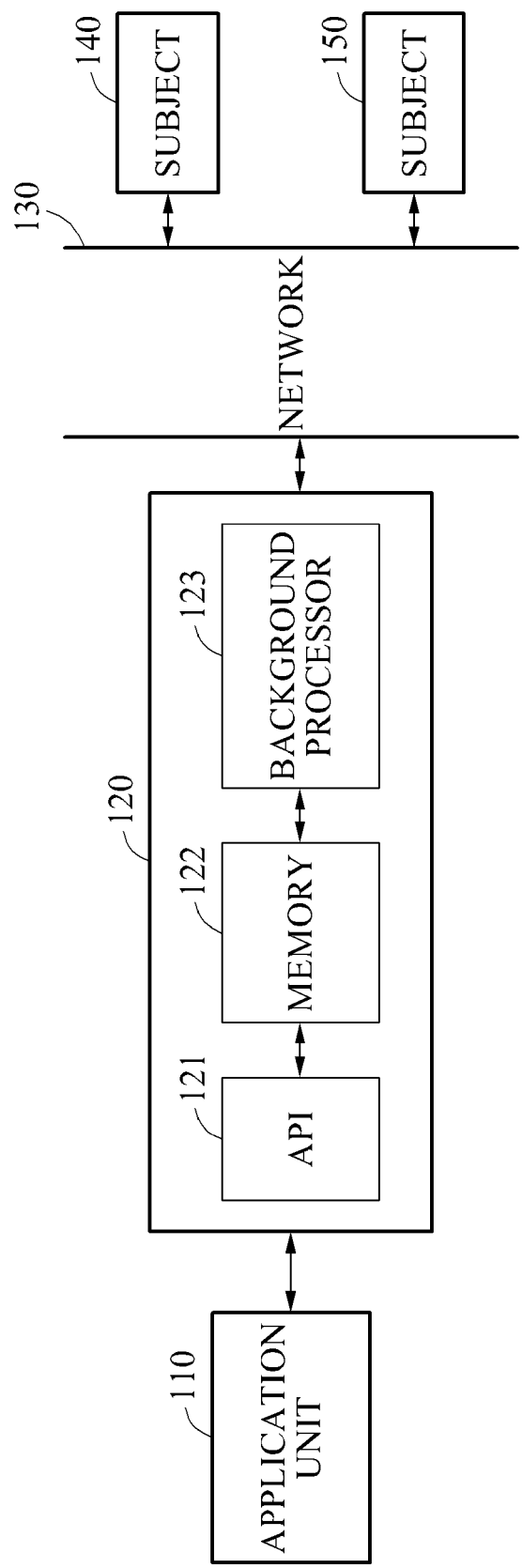
FIG. 1 is a diagram illustrating a data processing architecture according to at least one example embodiment.

Hereinafter, at least some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 is a diagram illustrating a data processing architecture according to at least one example embodiment.

Referring to FIG. 1, the data processing architecture includes an application unit 110 and a proxy unit 120.

The application unit 110 stores an application. The application unit 110 transmits a command of the application to the proxy unit 120 connected to the application unit 110. The application unit 110 may not directly communicate with a subject, for example, a subject 140 and a subject 150, through a network 130. The subjects 140 and 150 to be described hereinafter may perform an operation corresponding to the command of the application. The application unit 110 may indirectly communicate with the subject 140 or 150 through the proxy unit 120. The proxy unit 120 may be a proxy for transferring the command of the application unit 110 to the subjects 140 and 150.

The proxy unit 120 includes an application programming interface (API) 121, a memory 122, and a background processor 123.

The application unit 110 summons the API 121 to transmit the command of the application to the subject 140 or 150. The API 121 processes the command of the application. In detail, the API 121 processes the command of the application to allow the subject 140 or 150 to comprehend the command of the application.

The application unit 110 and API 121 may be hardware, firmware, hardware executing software or any combination thereof. When at least one of application unit 110 and API 121 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the application unit 110 and API 121. CPUs, DSPs, ASICs and FPGAs may generally be referred to as processing devices.

In the event where the at least one of the application unit 110 and API 121 is a processor executing software, the at least one of the application unit 110 and API 121 is configured as a special purpose machine to execute the software, stored in a memory (e.g., memory 122), to perform the functions of the at least one of the application unit 110 and API 121.

The application unit 110 writes the command in the memory 122 through the API 121. The command to be written in the memory 122 may be the command processed by the API 121. The memory 121 may refer to a memory accessible by the application unit 110 and the background processor 123. The application unit 110 and the background processor 123 may share data and the like through the memory 122. For example, the memory 122 may include a shared memory of an inter-process communication (IPC), which is a service provided by an operation system (OS). The shared memory may be provided as an example and thus, the memory 122 may not be limited to such a shared memory described in the foregoing. As described in the foregoing, the memory 122 may be a logical concept including an area in which data may be stored for autonomous programs or processors to share the data.

The background processor 123 accesses the memory 122 by operating in a background. For example, the background processor 123 may be a daemon. The background processor 123 may periodically access the memory 122. The background processor 123 may fetch the command recorded in the memory 122, and transmit the fetched command to the subject 140 or 150 through the network 130. The background processor 123 may include a plurality of threads. For example, the background processor 123 may include a transmission thread to transmit the fetched command. The transmission thread may access the memory 122 and fetch the command recorded in the memory 122.

For example, when the subject 140 is a motor and a command for increasing a torque of the motor is recorded in the memory 122, the background processor 123 may read the command recorded in the memory 122. The background processor 123 may transmit the command recorded in the memory 122 to the motor and thus, the motor may perform an operation of increasing the torque.

The subject 140 or 150 transmits a result of performing an operation corresponding to the command to the background processor 123 through the network 130. For example, the subject 140 may transmit, to the background processor 123, identification information used to identify the subject 140 from the subject 150. Thus, the subject 140 or 150 may transmit the result of performing the operation along with the identification information. The background processor 123 may then identify which subject transmits the result of performing the operation by referring to the received identification information.

The identification information may include at least one of a number corresponding to a portion in which the subject 140 or 150 is located and a type of the subject 140 or 150.

The type may be associated with the operation to be performed by the subject 140 or 150. A detailed description will be provided hereinafter with reference to an example of using a walking assistance device. In a case of the number, "0" may correspond to a portion of the walking assistance device that supports a left leg of a user, and "1" may correspond to a portion of the walking assistance device that supports a right leg of the user. In a case of the type, to a motor generating auxiliary power of the walking assistance device may correspond type 1, a torque sensor measuring a torque may correspond to type 2, and a posture sensor sensing a posture of the user wearing the walking assistance device may correspond to type 3. The description of the identification information in the foregoing is provided as an example and thus, the identification information may not be limited to the example described in the foregoing.

The background processor 123 receives, through a reception thread, the result of performing the operation transmitted from the subject 140 or 150. The background processor 123 may include a mapping table in which the type and the number corresponding to the portion in which the subject 140 or 150 is located are recorded. The background processor 123 may verify which subject transmits the result of performing the operation by referring to the mapping table. For example, when the result of performing the operation includes 0 and type 1, the background processor 123 may verify that the motor of the portion supporting the left leg transmits the result of performing the operation.

The background processor 123 records the result of performing the operation in the memory 122. For example, the reception thread of the background processor 123 may dispatch the result of performing the operation to a buffer corresponding to the subject 140 or 150 transmitting the result of performing the operation.

The application unit 110 accesses the memory 122 through the API 121, and reads the result of performing the operation of the subject 140 or 150 which is recorded in the memory 122. The application unit 110 may convert the result of performing the operation to a valid context and provide the user with the context.

A transmission frequency, or a transmission cycle, of a realtime command may be used to control system performance. In an example, when the controlling of system performance including the data processing architecture is greatly affected by the transmission frequency, a command of an application may be classified as the realtime command. In other cases, a command of the application may be classified as a non-realtime command. For example, when a control command for auxiliary power for the user wearing the walking assistance device has a short transmission cycle, the auxiliary power may be controlled in real time. Conversely, when the control command for the auxiliary power has a long transmission cycle, the auxiliary power may not be controlled in real time. A control performance of the walking assistance device may be affected by such a realtime control of the auxiliary power and thus, the control command for the auxiliary power may be classified as the realtime command.

A command of an application that has a long transmission cycle but does not substantially affect a control performance of a system may be classified as the non-realtime command. For example, the non-realtime command may include a command associated with a user interface, a command for setting a parameter of a subject, or a command for measuring a voltage of a subject.

The memory 122 may include a first memory area in which the realtime command of the application is recorded and a second memory area in which the non-realtime command of the application is recorded. For example, when a serial command for controlling the auxiliary power is R1, R2, R3, R4, and R5 and items desired to be verified through the user interface are A, B, C, D, and E, then R1, R2, R3, R4, and R5 may be recorded in the first memory area and A, B, C, D, and E may be recorded in the second memory area.

The background processor 123 may read the first memory area, and transmit the realtime command recorded in the first memory area to the subject 140 or 150 performing an operation corresponding to the realtime command. Similarly, the background processor 123 may read the second memory area, and transmit the non-realtime command recorded in the second memory area to the subject 140 or 150 performing an operation corresponding to the non-realtime command. Here, the transmission thread of the background processor 123 may read the first memory area and the second memory area. After the background processor 123 transmits the realtime command and then non-realtime command, the background processor 123 may transmit the realtime command and then non-realtime command again.

In the example described in the foregoing, when the realtime command and the non-realtime command are not classifiable, R1 may be transmitted to a subject and all the items desired to be verified may be transmitted to another subject, and R2 may then be transmitted to the subject. The background processor 123 may sequentially transmit R1, A, B, C, D, E, and R2. When R1, A, B, C, D, E, and R2 are sequentially transmitted, an operation of a subject requiring realtime processing may be suspended during transmission of A, B, C, D, and E in a network with a small bandwidth.

Conversely, in the example described in the foregoing, when the realtime command and the non-realtime command are classifiable, the background processor 123 may transmit R1 recorded in the first memory area to a subject in a first cycle, and A recorded in the second memory area to another subject in a second cycle. The background processor 123 may transmit R2 recorded in the first memory area to the subject in a third cycle, and B recorded in the second memory area to another subject in a fourth cycle. The background processor 123 may sequentially transmit R1, A, R2, B, R3, C, R4, D, R5, and E. When R1, A, R2, B, R3, C, R4, D, R5, and E are sequentially transmitted, an interval time between a point in time at which R1 is transmitted and a point in time at which R2 is transmitted may be shortened. Thus, in the network with a low bandwidth, the subject requiring the realtime processing such as a motor may operate in real time due to the shortened transmission cycle of the realtime command.

The application unit 110 may not directly communicate with the subject 140 or 150. The application unit 110 may indirectly communicate with the subject 140 or 150 through the proxy unit 120. The proxy unit 120 may function as a proxy for network transmission and reception for the application unit 110. The application may not be affected by an actual implementation of the network 130 due to the proxy unit 120 communicating between the application unit 110 and the subject 140 or 150. In addition, the application unit 110 may read, from the memory 122, the result of performing the operation corresponding to the command and thus, a blocking delay that may be caused by the network transmission and reception may be reduced.

Further, the application may not be affected by a speed of the network transmission and reception and thus, may perform asynchronous processing with respect to data. The application may reduce dependency on the network 130, and modifiability of the system may be improved by separation of an application area and a background process area under a condition in which compatibility of the API 121 is maintained.

Figure 2:
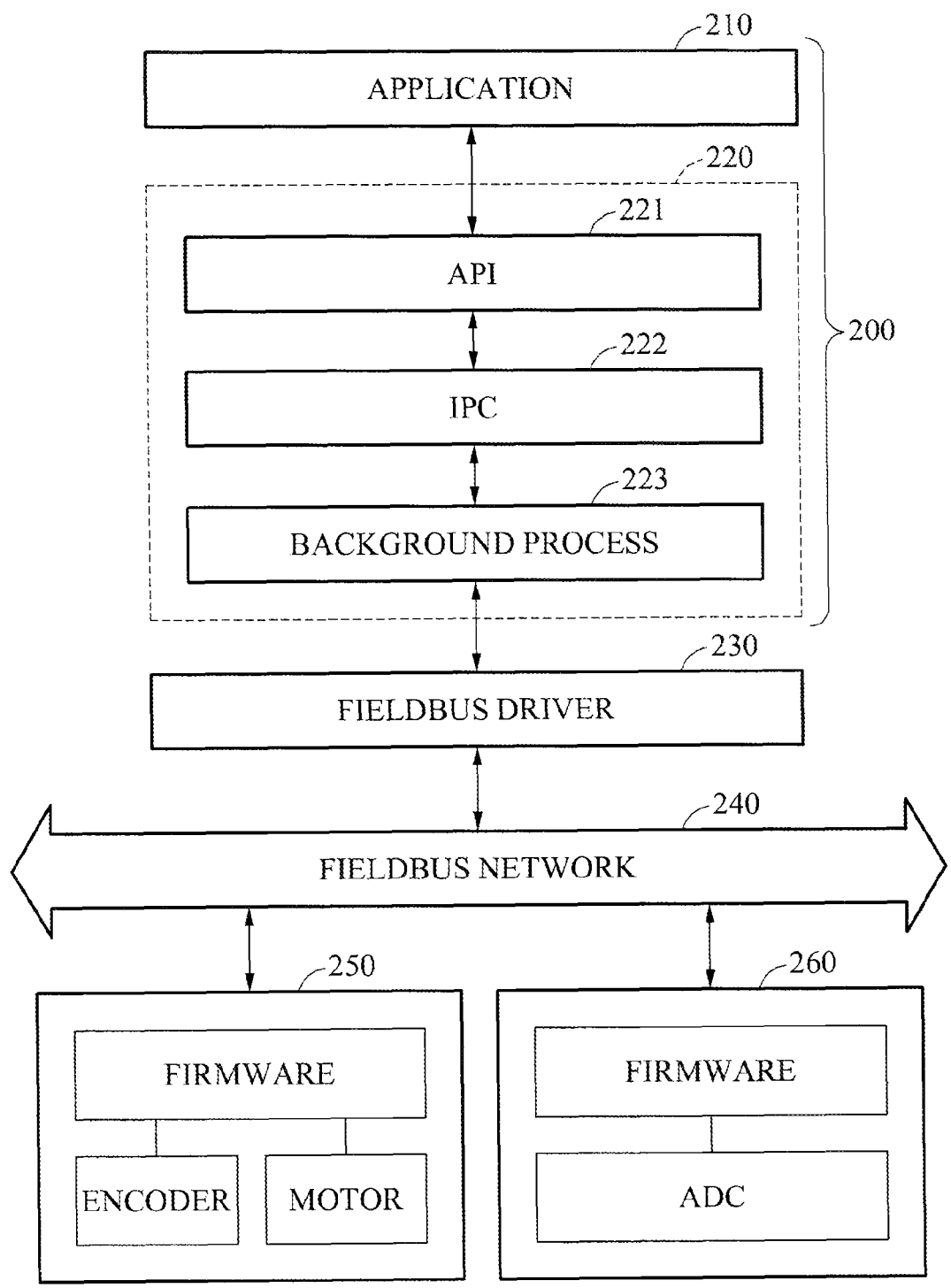
FIG. 2 is a diagram illustrating a layered software architecture according to at least one example embodiment.

FIG. 2 is a diagram illustrating a layered software architecture 220 according to at least one example embodiment.

Referring to FIG. 2, the layered software architecture 220 is interposed between an application 210 and a fieldbus network 240. The layered software architecture 220 may function as a proxy for the application 210 in network transmission and reception. Hereinafter, the layered software architecture 220 will be referred to as a proxy 220.

A main processor operating the application 210 and the proxy 220 may operate in an OS based environment. An environment of a subprocessor, which indicates an operating environment of at least one subject, for example, a subject 250 and a subject 260, connected to the fieldbus network 240, may not be the OS based environment.

The application 210 may summon an API 221 of the proxy 220 and record a command in a memory through the API 221. The memory may be a service accessible by a plurality of autonomous processors among services provided by an OS. For example, the memory may be a shared memory of an IPC 222.

A background process 223 may periodically access the memory, read the command recorded in the memory, and transmit the command to the fieldbus network 240 through a fieldbus driver 230. The functions of the background process 223 may be executed by a background processor (e.g., the background processor 123). The background processor may be part of the main processor or a separate processor. For example, the fieldbus network 240 may include a controller area network (CAN), and the CAN may support communication at a transmission speed of maximum 1 megabit per second (Mbps).

The command of the application 210 may be transmitted to a subject performing an operation corresponding to the command among a plurality of subjects, for example, the subject 250 and the subject 260, connected to the fieldbus network 240. The subject 250 or 260 may perform the operation corresponding to the command and transmit a result of performing the operation to the background process 223 through the fieldbus network 240. The background process 223 may record the result of performing the operation in the memory to be mapped to the subject 250 or 260. The application 210 may use the result of performing the operation recorded in the memory by accessing the memory through the API 221.

The descriptions provided with reference to FIG. 1 may be applicable to the descriptions provided with reference to FIG. 2 and thus, repeated descriptions will be omitted here for brevity.

Figure 3:
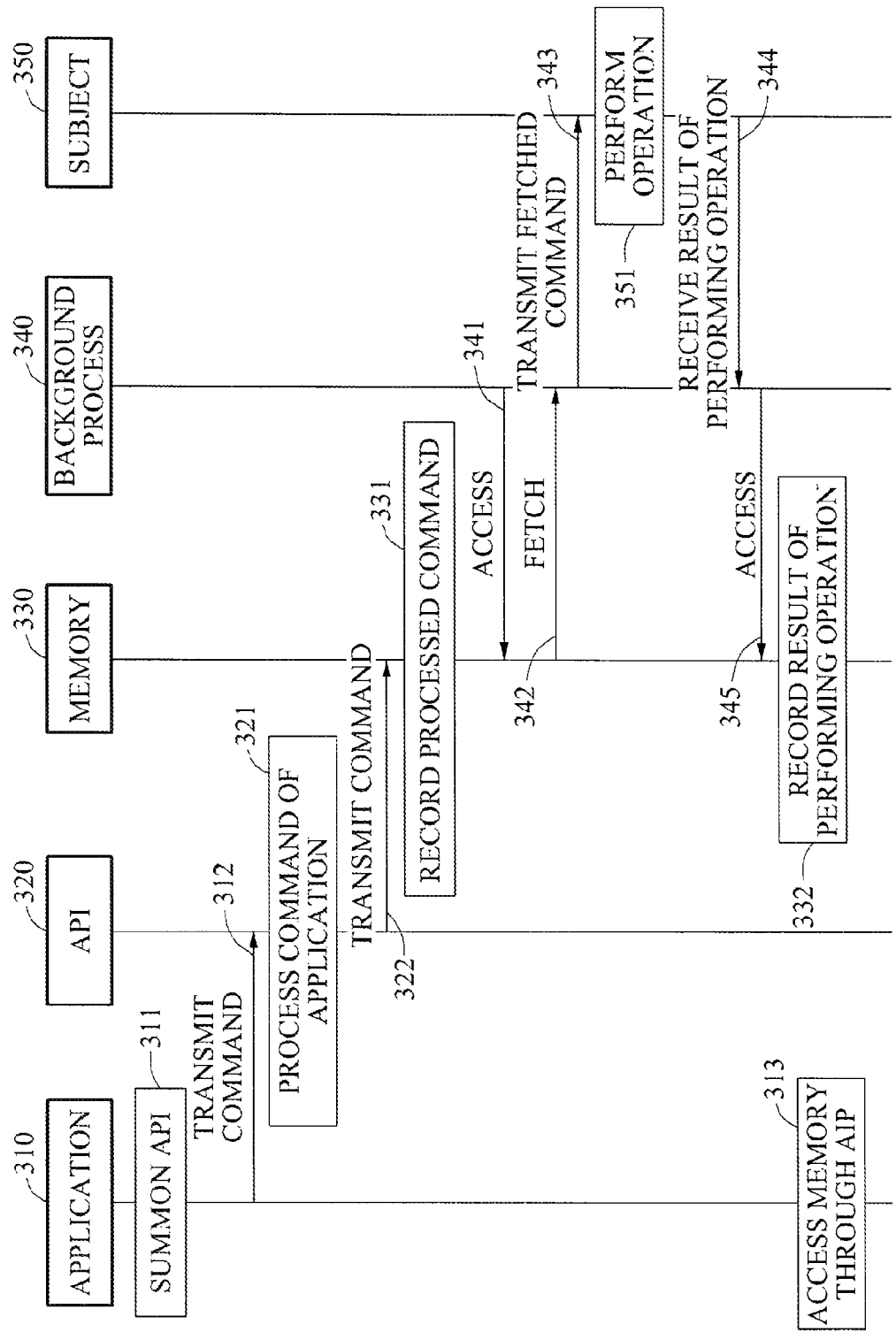
FIG. 3 is a diagram illustrating a data processing method according to at least one example embodiment.

FIG. 3 is a diagram illustrating a data processing method according to at least one example embodiment.

The data processing method may be performed by a data processing architecture.

Referring to FIG. 3, an application 310 summons an API 320 to record a command of the application 310 in a memory 330 in operation 311. The API 320 processes the command of the application 310 to allow a subject 350 to comprehend the processed command in operation 321. The application 310 records the command in the memory 330 through the API 320 in operation 331.

In an example, the memory 330 may include a first memory area in which a realtime command of the application 310 is recorded and a second memory area in which a non-realtime command of the application 310 is recorded. A background process 340 may alternately access the first memory area and the second memory area. The functions of the background process 340 may be executed by a background processor (e.g., the background processor 123). The background processor may be part of the main processor or a separate processor. The command of the application 310 may be classified as the realtime command and the non-realtime command and thus, a transmission cycle of the realtime command may be shortened.

The background process 340 accesses the memory 330 in operation 341 and fetches the command recorded in the memory in operation 342. A transmission thread of the background process 340 transmits the fetched command to the subject 350 through a network in operation 343. The background process 340 and the subject 350 may be connected through the network. For example, the network may be a fieldbus network, and the fieldbus network may include a CAN supporting a communication speed of maximum 1 Mbps.

The subject 350 performs an operation corresponding to the command in operation 351. For example, in a case of a walking assistance device, the background process 340 may transmit a command for controlling a hip joint of the walking assistance device, for example, a command for controlling flexion or extension of the hip joint, and a motor may generate power for the flexion or the extension of the hip joint in response to the command. For another example, the background process 340 may transmit a command for measuring a joint angle of the hip joint, and a measuring sensor may measure the joint angle that varies depending on a step of a user in response to the command.

The subject 350 transmits a result of performing the operation to the background process 340 through the network. The background process 340 receives the result of performing the operation in operation 344, and accesses the memory 330 in operation 345. In an example, a reception thread of the background process 340 may dispatch the result of performing the operation to a buffer to be mapped to the subject 350 using identification information of the subject 350 included in the result of performing the operation.

The result of performing the operation of the subject 350 is recorded in the memory 330 in operation 332. The application 310 accesses the memory 330 through the API 320 in operation 313, and uses the result of performing the operation recorded in the memory 330. Here, the application 310 may convert the result of performing the operation to a context and provide the user with the context.

The descriptions provided with reference to FIGS. 1 and 2 may be applicable to the descriptions provided with reference to FIG. 3 and thus, repeated descriptions will be omitted here for brevity.

Figure 4:
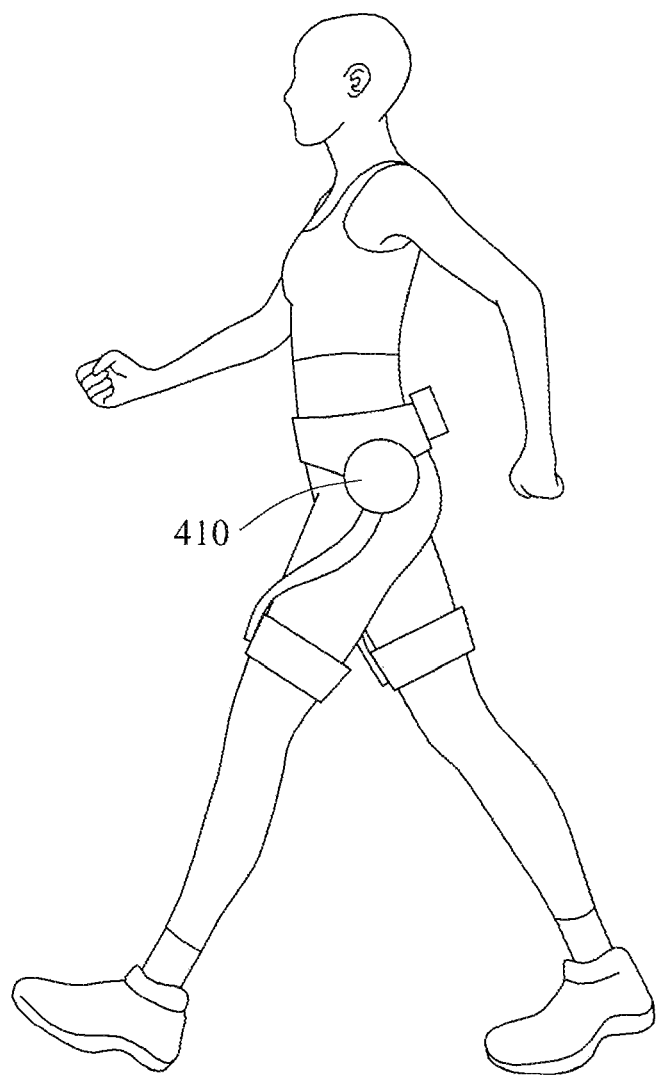
FIGS. 4 and 5 illustrate a walking assistance device to which a data processing architecture is applied according to at least one example embodiment.
Figure 5:
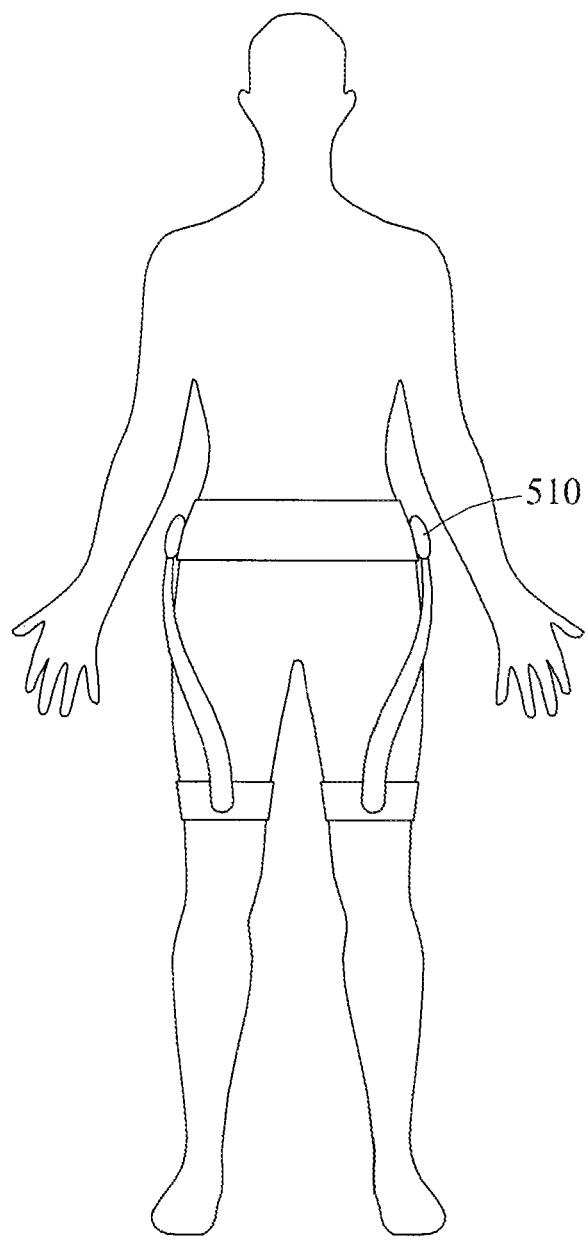

FIGS. 4 and 5 illustrate a walking assistance device to which a data processing architecture is applied according to at least one example embodiment.

The walking assistance device illustrated in FIGS. 4 and 5 may include a main processor configured to operate an application and a proxy for data transmission and reception of the application, a fieldbus network, and at least one subject connected to the fieldbus network.

In a case of a low-speed fieldbus network being used, transmission and reception of plural sets of data may not be easily performed due to a limited bandwidth. In addition, the limited bandwidth may lead to an occurrence of a delay in the transmission and the reception of the data and the delay may affect a network speed and accordingly, an operation of the application.

In an example, the application may not directly transmit and receive data to and from a subject through a network, but the application may indirectly transmit and receive the data to and from the subject through a software layer functioning as a proxy interposed between the application and the network. The software layer may refer to a proxy. The proxy may perform substantial network communication with the subject through a background process. The proxy may periodically transmit and receive data required for control and measurement to and from the subject within an allowable range of a bandwidth of the network, and store the transmitted and received data in a memory area. The application may not directly perform a network operation, but perform a required data operation by accessing the memory area provided by the proxy.

Referring to FIGS. 4 and 5, a user wears a hip-type walking assistance device. The walking assistance device illustrated in FIGS. 4 and 5 is provided only as an example and thus, the walking assistance device may not be limited to the hip-type walking assist device and may include, for example, a lower body full-supporting type or a lower body partial-supporting type. The lower body partial-supporting type may include a type supporting up to a knee and a type supporting up to an ankle. The walking assistance device may include a driving source, for example, a driving source 410 of FIG. 4 and a driving source 510 of FIG. 5, which drives joints of the walking assistance device to support physical strength of legs of the user. For example, each of the driving sources 410 and 510 may include two motors to transfer driving power to each of hip joints in both sides.

An application stored in the walking assistance device may generate a command for controlling the driving sources 410 and 510. The application may transmit the command to the proxy without directly transmitting the command to the driving sources 410 and 510. The application may summon an API, and the API may process the command to allow the driving sources 410 and 510 to comprehend the command. The processed command may be recorded in a memory provided by the proxy through the API. The memory may include a storage in which data to be shared with the application and autonomous processes such as a background process to be executed by a background process is stored. The background process operating in a background may read the command recorded in the memory, and transmit the command to the driving sources 410 or 510 through a transmission thread. For example, the driving source 410 may transmit the driving power to the hip joints of the walking assistance device in response to the command.

The driving sources 410 and 510 may transmit a result of performing an operation corresponding to the command to the background process, and the background process may then receive the result of performing the operation through a reception thread. For example, the reception thread of the background process may record the result of performing the operation in a buffer corresponding to the driving source 410. The application may read the result of performing the operation recorded in the buffer, and convert the result of performing the operation to a context and provide the user with the context.

In another example, the walking assistance device may obtain, using a sensor, at least one of a joint angle of a hip joint, acceleration information associated with steps of the user, and posture information, which are changed based on the steps of the user.

The application may transmit the command to the proxy without directly transmitting the command to the sensor to measure the joint angle of the hip joint varying depending on the steps of the user. The proxy performing an operation of network transmission and reception may transmit the command to the sensor and receive measurement information from the sensor. The proxy may store the measurement information in the memory, and the application may read the measurement information stored in the memory.

Although not illustrated in FIGS. 4 and 5, the data processing architecture may be applied to an intelligent robot platform. The data processing architecture may include a proxy configured to transmit a command of an application to a subject or receive a result from the subject by proxy for the application, a network, and at least one subject connected to the network. The application and the proxy may be driven in a main processor operating based on an OS. The subject may include a motor or a sensor, and perform an operation corresponding to the command of the application.

The intelligent robot platform may be implemented through a multiprocessing system including a main processor, a plurality of subprocessors, and a network connecting the main processor and the subprocessors. An application operating in the main processor may transmit a command to a subject operating based on a subprocessor. The command may be transmitted through a proxy without being directly transmitted from the application. The application may not be directly involved in network communication.

The proxy may include a background process, and the background process may transmit the command of the application to the subject through the network. The background process may receive a result of performing an operation corresponding to the command from the subject through the network. The background process may record the result in a memory space provided by the OS. The memory space may refer to a space in which autonomous processors share data.

The application may access the memory space and read the result. The application may not directly receive the result from the subject. The application may not directly participate in the network communication to receive the result.

Applying such a data processing architecture may prevent the application from being affected by a speed of network transmission and reception and a performance of a robot system from deteriorating by a blocking delay. Further, applying the data processing architecture may enable a real-time operation of a robot to which a low-speed network is applied.

The data processing architecture may be provided in a form of a physical and standalone device. The data processing architecture may also be provided in a form of a system on chip (SoC) and embedded in a mobile terminal such as the walking assistance device.

The units and/or modules described herein may be implemented using hardware components and software components. For example, the hardware components may include microphones, amplifiers, band-pass filters, audio to digital converters, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing method to be performed by a data processing architecture, the method comprising:
fetching, using a main processor executing an application, a command of the application recorded in a memory, in a background process;
transmitting, using the main processor, the fetched command to a subject configured to perform an operation corresponding to the fetched command, in the background process, wherein the subject is connected to a field bus network;
receiving, using the main processor, a result of performing the operation of the subject, in the background process; and
recording, using the main processor, the result of performing the operation in the memory, in the background process,
wherein the transmitting comprises alternately transmitting a fetched non-realtime command and a fetched realtime command in the background process.

2. The method of claim 1, wherein the memory comprises an inter-process communication (IPC) shared memory.

3. The method of claim 1, wherein the memory comprises a first memory area in which a realtime command of the application is recorded and a second memory area in which a non-realtime command of the application is recorded.

4. The method of claim 1, wherein the command is recorded in the memory by the application through an application programming interface (API).

5. The method of claim 1, wherein
the transmitting transmits the fetched command through a transmission thread of the background process, and
the receiving receives the result of performing the operation through a reception thread of the background process.

6. The method of claim 1, wherein the recording records the result of performing the operation in a buffer.

7. The method of claim 1, wherein the data processing architecture is embedded in a walking assistance device.

8. The method of claim 1, wherein the data processing architecture is configured to perform as a proxy for data transmission and reception of the application in the main processor.

9. A non-transitory computer-readable medium comprising program code, when executed by a computing processor, configured to cause the computing processor to,
fetch, by executing an application, a command of the application recorded in a memory, in a background process;
transmit the fetched command to a subject configured to perform an operation corresponding to the fetched command, in the background process, wherein the subject is connected to a field bus network;
receive a result of performing the operation of the subject, in the background process; and
record the result of performing the operation in the memory, in the background process,
wherein a fetched non-realtime command and fetched realtime command are alternatively transmitted in the background process.

10. A data processing architecture, comprising:
an application programming interface (API) configured to process a command of an application;
a memory configured to record the processed command; and
a processor configured to access the memory to fetch the recorded command in a background process, transmit the fetched command through a network to a subject configured to perform an operation corresponding to the fetched command in the background process, and receive a result of performing the operation from the subject in the background process and record the result of performing the operation in the memory, wherein a fetched non-realtime command and fetched realtime command are alternatively transmitted in the background process.

11. The architecture of claim 10, wherein the memory comprises an inter-process communication (IPC) shared memory.

12. The architecture of claim 10, wherein the memory comprises a first memory area in which a realtime command of the application is recorded and a second memory area in which a non-realtime command of the application is recorded.

13. The architecture of claim 10, wherein the processor comprises a transmission thread configured to transmit the fetched command and a reception thread for configured to receive the result of performing the operation.

14. The architecture of claim 10, wherein the processor is configured to record the result of performing the operation in a buffer to be mapped to the subject.

15. The architecture of claim 10, wherein the processor is configured to access the memory at each selected cycle.

16. The architecture of claim 10, wherein the network comprises a fieldbus network.

17. The architecture of claim 10 comprised in a walking assistance device.

* * * * *